INVENTOR
*RAYMOND C. ELTON*

United States Patent Office 3,432,659
Patented Mar. 11, 1969

3,432,659
X-RAY DETECTOR SYSTEM FOR DETERMINING PLASMA ELECTRON TEMPERATURE
Raymond C. Elton, Hyattsville, Md., assignor to the United States of America as represented by the Secretary of the Navy
Filed May 26, 1966, Ser. No. 553,607
U.S. Cl. 250—71.5                  11 Claims
Int. Cl. H01j *39/18;* G01t *1/20*

ABSTRACT OF THE DISCLOSURE

This device is directed to a system for simultaneously measuring X-rays emitted from a high temperature plasma source by using four separate measuring channels each of which has a thin metallic foil through which the X-rays pass. The four channels are positioned about the axis of the system such that X-rays may also pass through the device along the axis to be detected by a vacuum spectrograph or a mass spectrometer. The radiation passes through each of the foils striking a scintillator material which gives off light that is detected by separate photo detectors. The foils are mounted onto a rotatable wheel that contains twelve different foils, thus each detector may be used to detect X-rays that pass through one each of three foils that may be rotated into place. The X-ray signals are compared to determine the electron temperature of a plasma above two million degrees.

---

The invention described herein may be manufactured and used by or for the Government of the United States of America for governmental purposes without the payment of any royalties thereon or therefor.

The present invention is directed to a device for detecting soft X-rays and more particularly to a device for simultaneously measuring X-rays admitted from a high temperature plasma source by using four separate detectors to determine plasma electron temperatures in the region above two million degrees without any disturbance of the vacuum environment in which the X-radiation originates.

Heretofore, X-ray measurements have been made in vacuum, however there are several drawbacks in such systems. Such drawbacks involve calibration of the detector devices with subsequent disassembly of the apparatus prior to temperature measurement, thereby breaking the vacuum seal to replace and alternate certain detector equipment within the vacuum system. This requires considerable time in pump down of equipment which in addition may disrupt the system as calibrated or the source. Such systems heretofore made use of foils as vacuum seals through which the X-rays pass. The disadvantage here lies in the danger of destroying the very thin metallic foils thus allowing atmospheric air to enter the experiment at an undesirable moment. Still another drawback involves the utilization of glass fiber light pipes to transmit scintillator fluorescent radiation to the photomultiplier detectors. The problem here surrounds the fact that all fast X-ray phosphors emit blue fluorescent radiation while light pipes transmit chiefly in the yellow region of the spectrum. Thus, a large portion of the radiation is absorbed by the glass fibers and not passed on to the detectors. Previous detector designs have not in the past permitted the simultaneous use of other plasma diagnostic detectors at the same viewing port on the high temperature source device within which the X-radiation is produced.

The device of the present invention makes it possible to maintain a vacuum in the system during calibration of the detectors with subsequent movement of different foils into place before the detectors without breaking the vacuum. This is made possible by an assembly of twelve foils, four of which are made identical for calibration of the detection system, with two alternate sets of four coils for the comparison-temperature measurements. Thus, the foil assembly is rotatable within the system to present a choice of three groups of four foils before the four detectors which are used in the system. The rotatable foil assembly is positioned such that the foils are within the evacuated area rather than the foils being used to separate the evacuated area from a non-evacuated area. In the device of the present invention, foils are prepared and inserted within the system, a vacuum is created, and calibration is performed in place with the plasma X-ray source. Following calibration, four different comparison foils are moved into position immediately without any disturbance to the vacuum system. Also, in the present device, the delicate foil and the plastic scintillator used for each detector are enclosed in the vacuum and are not subjected to the differential pressure of the atmosphere, as in the case of the prior art devices wherein either the scintillator material or the foils acted as a vacuum seal. In addition, the device of the present invention makes use of large concave aluminumized mirrors to concentrate the light onto the photomultiplier detectors rather than making use of glass fibers light pipes such as used in the prior art devices. Additionally, provision is made for transmitting radiation along the axis of the device through the vacuum system to an additional detector for simultaneous measurements. Also, the device of the present invention includes adjustable pin holes which are provided to define the region of plasma viewed by the four detector channels.

It is therefore an object of the present invention to provide a device for determining plasma electron temperatures.

Another object is to provide a device in which the metallic foils through which X-rays pass are within the vacuum system and may be removed from their holder without disassembly of the overall device.

Still another object is to provide a device for determining plasma electron temperatures in which the foil elements may be rapidly changed with respect to the detector without breaking the vacuum of the system.

Yet another object is to provide a device in which the detectors of the system may be calibrated and then used as a detection device without breaking the vacuum seal in the system.

Still another object is to provide a device for detecting soft X-rays transmitted through thin metallic foils simultaneous with other measurements of X-rays and extreme ultraviolet radiation by additional equipment and through the same exit port from the X-ray source.

The nature of this invention as well as other objects and advantages thereof will be readily apparent from consideration of the following specification relating to the annexed drawings, in which.

Figure 1:
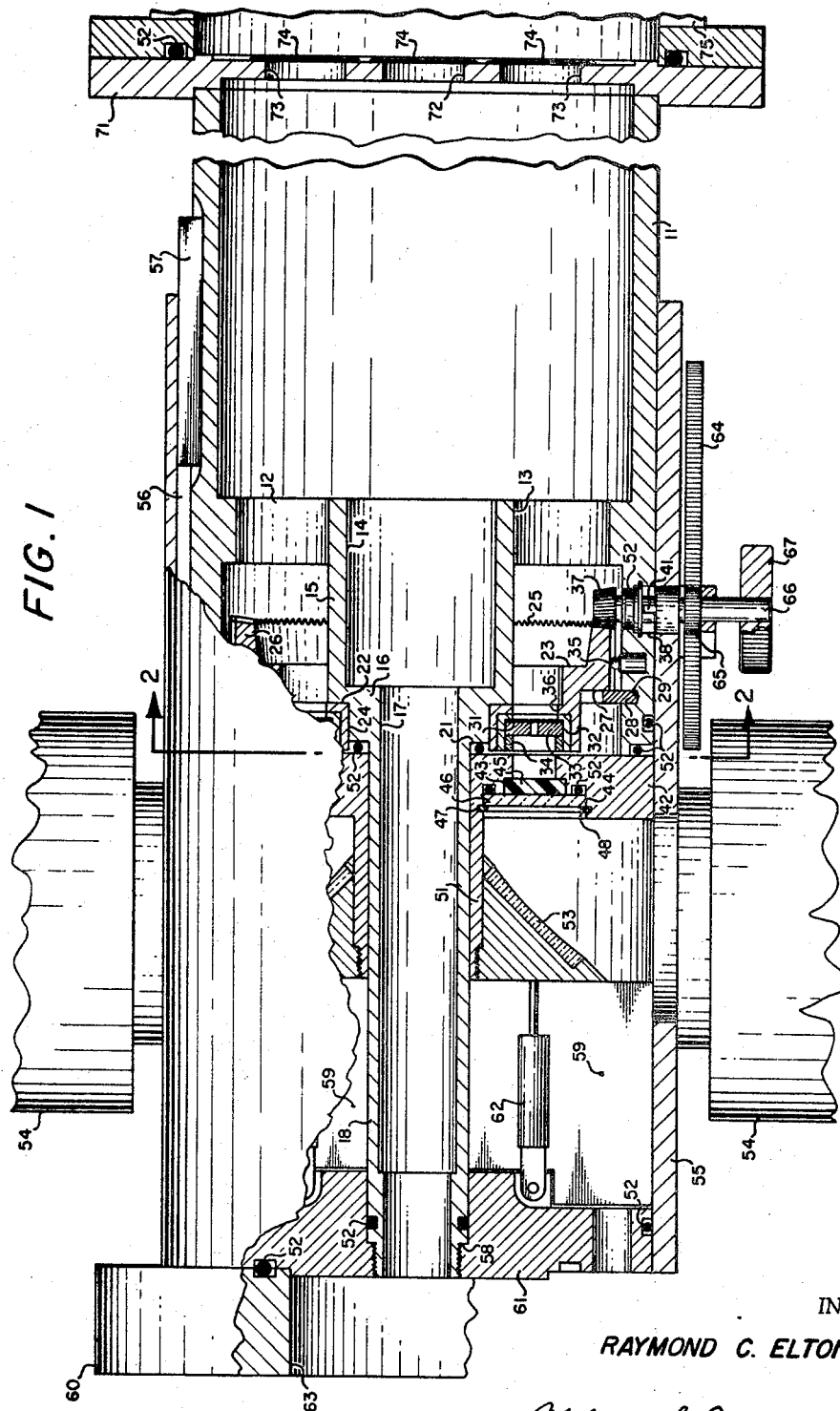
FIG. 1 is a partial cross-sectional view of the device made in accordance to the present invention.
Figure 2:
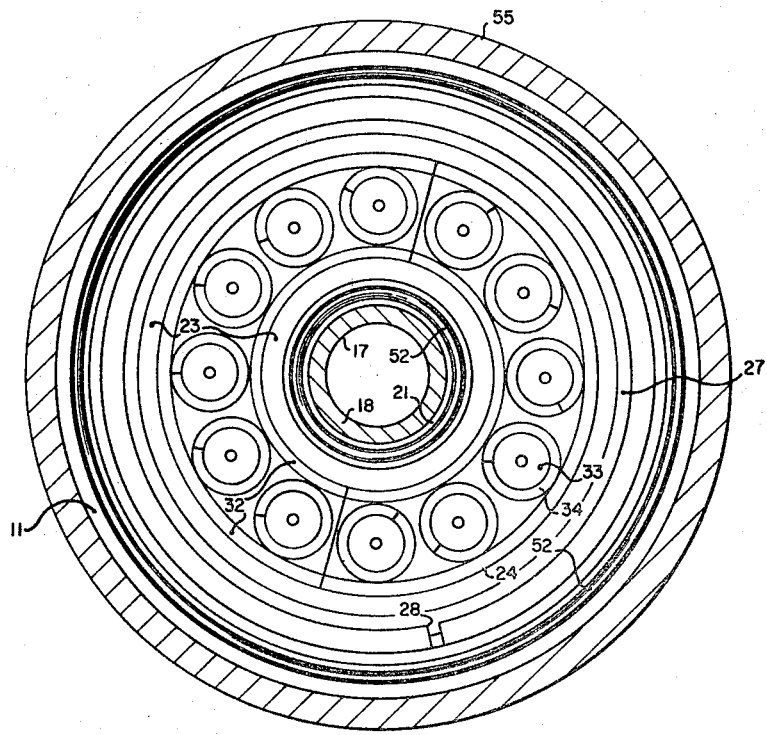
FIG. 2 is a cross-sectional view taken along lines 2—2 of FIG. 1 illustrating the relationship of the foils to the main structure.
Figure 3:
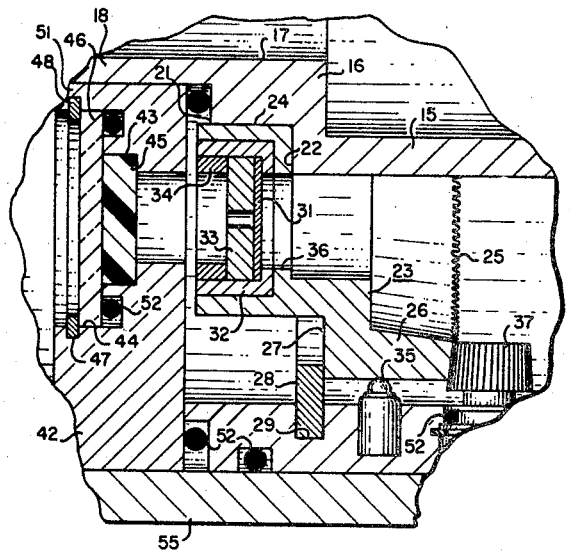
FIG. 3 is an enlarged cross-sectional view of one of the X-ray detection foils relative to a scintillator-window.
Figure 4:
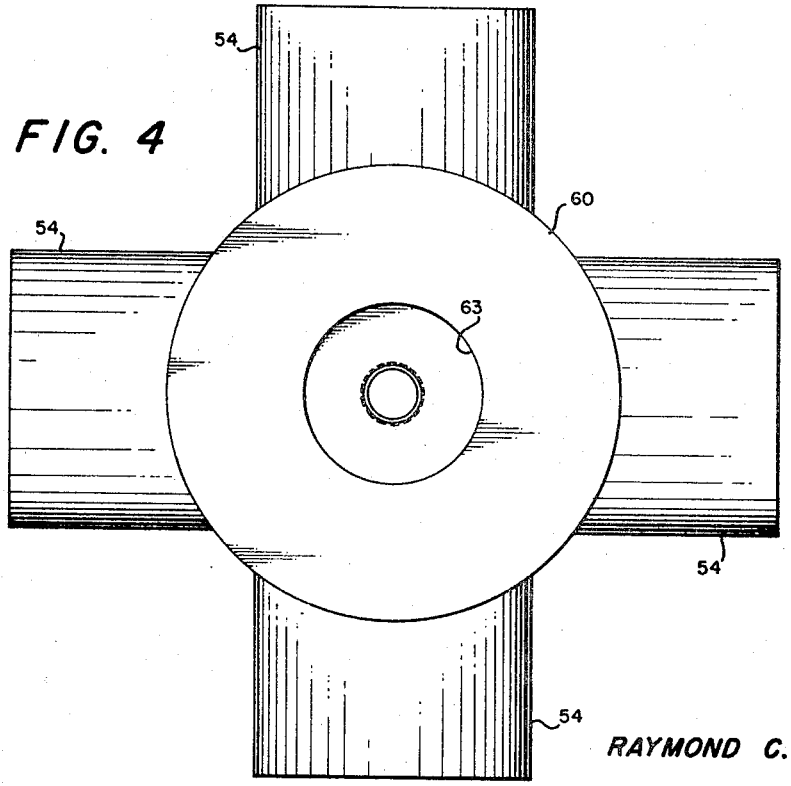
FIG. 4 is an end view illustrating the relationship of the photo-detectors with the housing that includes the X-ray detection channels.

The device of the present invention includes a vacuum tight housing having an enlarged cylindrical tubular end with a smaller tubular end portion extending therefrom in axial alignment therewith. The small tubular end portion extends from a cylindrical tubular portion having a greater diameter thereof which is in axial alignment therewith and which in turn extends from a partition across the largest cylindrical tubular portion. The partition is provided with four equiangularly spaced apertures therein which surround the tubular portion extending from the partition with their centers equidistant from the axis of the housing. An assembly including twelve equally spaced foils secured therein each equidistant from the center and in optical alignment such that four of the foils are in alignment with the apertures in the partition is secured for rotation about the smaller tubular section. An assembly includes four scintillating elements each between a window and a foil, each equiangularly spaced relative to each other, secured in alignment with the apertures in the partition within the housing and each has secured relative thereto a concave mirror at a 45° angle to the optical axis therewith. Each mirror reflects parallel light onto a photomultiplier of which there are four, spaced about the housing to receive light from the four mirrors. The opposite end of the housing is provided with an enclosure which has four equiangularly spaced apertures therein, wherein each of the apertures are provided with an adjustable means for adjusting the size and radial position of the aperture. The enclosure is also provided with an axial aperture which is in axial alignment with the tubular section at the opposite end.

Now referring to the drawings, there is shown by illustration a multi-channel X-ray detector using metallic foils made in accordance with the present invention. The device comprises two separate sections, one of which is vacuum tight and the other which is subjected to atmospheric pressure. The vacuum tight section is preferably made from a single cylindrical piece of stock which is milled to form three separate cylindrical tubular sections having different inner diameters. As such, the vacuum tight section includes a large cylindrical tubular section 11 with a partition 12 across the inner dimension thereof normal to the axis, a short distance inwardly from one end thereof. The partition includes four equiangularly spaced apertures 13 which surround an axial aperture 14 from which a cylindrical tubular section 15 extends and which has an inner diameter the same diameter as the axial aperture. The end of the cylindrical section 15 not joined with the partition 12 has a thicker wall section 16 to provide an aperture 17 from which extends a cylindrical tubular section 18 having an inner diameter the same diameter as the aperture 17. The three sections 11, 15 and 18 are preferably made from one piece stock material; however, the separate sections may be made separately and secured to one another in a vacuum tight structure. The thicker wall section 16 of the cylindrical section 15 from which the cylindrical portion 18 extends is provided with two shoulders 21 and 22 of different diameter on the outer end surface thereof, the purpose of which will be explained later.

A cylindrical bevel gear 23 is provided with a central aperture 24 of sufficient diameter to slide over and rotate about the shoulder 21 by use of gear teeth 25 on an outer edge of an axially extended portion 26. The axially extended portion is provided with a shoulder 27 opposite from the gear teeth by which the gear is held in place by a spring type split ring 28 that fits into a groove 29 in the inner surface of the larger tubular section of the housing. The beveled gear is provided with a circular recess within which a split foil holding ring 32 is mounted. The foil holder 32 is made in two semi-circular sections with the foils 31 equally spaced about each of the sections. The foils 31 are held in place within the holder 32 by suitable discs 33 and spring holders 34. The radial portions 16 of the section having the teeth thereon is provided with equally spaced indentations around the outer surface thereof for reception of a spring-loaded pin 35 which acts as a stop to position four of the foils in optical alignment with the equi-angularly spaced apertures 13 in the partition 12. The surface of the cylindrical wheel adjacent to the foils is provided with equally spaced apertures 36 therein through which radiation is permitted to pass to the foil. A beveled drive gear 37 suitable for driving the cylindrical beveled gear wheel 23 is positioned adjacent thereto in driving contact therewith with the shaft thereof extending into an aperture 38 within the wall of the larger diameter housing section such that the end of the shaft 41 thereof does not protrude beyond the outer surface of the housing. The shaft of the drive gear is provided with suitable means for sealing the spacing between the drive gear and the housing such that there will be a vacuum tight seal.

A cylindrical assembly 42 having the same outer diameter as the larger diameter portion of the vacuum section with a central aperture sufficiently large to slide over the outer surface of the smallest diameter portion 18 of the vacuum section is provided to enclose the end of the larger diameter vacuum section. The cylindrical assembly is provided with four equi-angularly spaced apertures therein which are positioned in optical alignment with the apertures 13 and 36 in the partition within the larger diameter section of the vacuum portion of the device and the cylindrical wheel 23 respectively. Each of the apertures in the cylindrical member is provided with two cylindrical portions 43 and 44 of different diameter for the reception of a plastic scintillator 45 in the smaller diameter portion 43 and a suitable window 46 in the larger diameter portion. The larger diameter portion outwardly of the window is provided with an O-ring 52 vacuum seal and a groove 47 therein within which a split spring washer 48 is fitted to hold the window and scintillator in place. The cylindrical assembly is also provided with a tubular portion 51 which extends outwardly therefrom along the smaller diameter portion 18 of the vacuum section. In order to insure that the cylindrical assembly forms a vacuum tight end section for the larger diameter cylindrical section of the vacuum section, suitable O-rings 52 are placed between the cylindrical section and the end of the cylindrical tubular portion of the vacuum system, about the smaller diameter tubular section and also an O-ring is placed around each of the scintillators in each of the apertures within the cylindrical assembly such that a vacuum seal is provided between the O-ring and the glass window. The cylindrical assembly is provided with four concave one-inch focal length mirrors 53 each of which are in optical alignment with the scintillator and at a forty-five degree angle relative to the axis thereof such that fluorescent radiation from the scintillator incident onto the mirrors will be directed outwardly therefrom at a ninety degree angle with respect to the axis of the assembly.

The fluorescent radiation incident on each of the concave mirrors is directed into suitable photomultipliers 54 which are held in position by a cylindrical housing 55 which encloses the portion of the device which is subjected to atmospheric canditions. The cylindrical tubular member that holds the photomultiplier tubes in position is of suitable length that it extends down over the larger diameter section of the vacuum section of the device to provide a light seal. The outer cylindrical tubular housing 55 is provided with a key way 56 which slides along a key 57 secured to the outer surface of the larger cylindrical portion of the vacuum section of the device. The outer cylindrical housing is made for movement along the vacuum housing section 11 in order to move the photomultiplier tubes and the outer cylindrical housing down sufficiently such that the cylindrical assembly may be moved away from the foil section, thereby permitting one to remove and replace foils with different types of foil without removing the device from the entire vacuum system.

Thus by movement of the cylindrical housing axially along the housing 11, the area between the mirrors 53 and the window-scintillator assembly will be exposed to facilitate movement of the window-scintillator assembly away from the cylindrical gear 23 upon which the foils are mounted. Thus, the foil assembly will be open to the atmosphere which will permit removal of each of the foils for replacement or repair.

By replacement of the foils in this manner, the alignment of the X-ray detector system with that of the plasma source is not disturbed. The only requirement is that the system be exposed to atmospheric conditions and then evacuated upon reassembly.

The outer end of the smaller diameter portion 18 of the vacuum section is provided with a shoulder 58 thereon over which an end structure 61 is secured for enclosing the atmospheric pressure end section against the entrance of light when the outer cylindrical housing is moved into place in sealing contact therewith for operation. Suitable O-rings are placed in the end enclosure and about the larger cylindrical member of the vacuum section to prevent light from entering into the area of the section in which the mirrors are included. The cylindrical assembly upon which the mirrors are positioned is provided with four radial slots therein into which suitable separator members 59 are placed to prevent light interference between adjacent detector sections of the device. Thus, no stray light from one section can be reflected into the adjacent section. In order to prevent light from being reflected off the end enclosure 61 the inner surface is painted black or either an additional non-reflective member is included adjacent to the inner end surface. In order to hold the cylindrical assembly which includes the scintillators in place against the O-rings until the vacuum has been established, two spring-loaded plungers 62 are positioned between the end enclosure and the back surface of this cylindrical assembly such that pressure is applied to the cylindrical assembly by the spring-loaded plunger. The end enclosure is also provided with a central aperture 63 therein such that radiation may pass through the vacuum sealed portions of the device through the end cover onto any other suitable detector which may be secured thereto for detecting other desired radiation or particles from the source.

In order to determine the position of the different foils within the device, a reference ring 64 is secured to the outside of the cylindrical outer housing and is rotated by a suitable gear 65 which is rotated by a shaft 66 and knob 67 which shaft extends through the gear 65 such that when the outer cylindrical housing is in position for operation, the shaft 66 is in alignment with the axis of the beveled drive gear 37. Thus, the beveled drive gear will rotate the cylindrical wheel in which the foils are mounted within the device and the indicator wheel on the outside will likewise be rotated by a drive wheel 65 on the outside thereof corresponding to the movement of the wheel on the inside. Thus, an operator can determine which foils are positioned in front of the four apertures within the partition and in alignment with the four scintillator windows through which the X-rays may be detected.

The end of the device which is secured to the source is provided with a cover 71 having a central aperture 72 therein and also four equiangularly spaced apertures 73 therethrough. These four equiangularly spaced apertures are provided with adjustable pinholes 74 to permit adjustment in size and direction of the acceptance cone defined by these pinholes and those adjacent to the foils. The pinhole apertures in the end plate are accordingly in optical alignment with the apertures 13 in the partition within the large cylindrical section of the vacuum portion of the device and those in the rotating filter holders. The system is attached to the plasma source by a bellows 76 which permits an initial alignment of the vacuum spectrograph or other detection device which is in turn in alignment with the central aperture, and the X-ray foil detector which is assembled within the rotatable gear wheel in alignment with the adjustable apertures. Suitable locking screws are used with the bellows mechanism to lock the structure in position once it has been set correctly, to prevent bellows collapse and shifting of the alignment after evacuation of the system.

On assembly of the device the vacuum section including the three cylindrical portions of different diameter is formed and the equiangularly spaced apertures are made in the partition. The larger diameter section is provided with the beveled gear drive and the spring-loaded indexing mechanism. The cylindrical driven gear is formed with the foils therein in their holding rings with suitable apertures behind the foils to permit radiation to pass therethrough. Then the cylindrical foil holding wheel is placed in position about the central cylindrical diameter section of the vacuum portion and locked in place by the split-spring washer. The cylindrical assembly is formed with the equiangularly spaced scintillator-window arrangements thereon and then placed in position over the smaller diameter section of the vacuum portion such that the scintillator windows are in optical alignment with the four apertures in the partition within the larger diameter section of the vacuum portion and secured in place by the spring-loaded clamps. The outer housing with the photomultiplier tubes attached thereto is then slid over the outer surface of the larger diameter section of the vacuum portion; then the end enclosure is assembled in place and secured to the cut-down portion of the smaller diameter section of the vacuum portion. Prior to assembly of the various elements, suitable O-rings are placed in their proper position such that the apparatus will be vacuum and/or light tight as necessary. The outer cylindrical housing including the photomultiplier tubes is placed in position and then the outer housing is locked in place.

The foil assembly is made with twelve equally spaced foils, six in each semi-circular ring, four of which are made identical for calibration of the detection system and spaced such that the four identical foils will be in position to receive radiation through the four apertures in the partition and such that the radiation will be detected by the photomultipliers in order to calibrate the system. The other eight foils may be made of the same or of different material and of different thickness such that there will be two sets of four each to be positioned before the detectors thereby making use of two choices of four different foils each, one each for each of the detectors. Thus, for any one source, two separate groups of foils may be used in which each of the foils are different.

In operation, the device is assembled as set forth above and then connected to the vacuum system with which the device is to operate. The device is joined to the system with the larger diameter cylindrical section of the vacuum portion toward the source and the closed end away from the source such that a second detection system may be secured to the closure thereby permitting additional diagnostics of the plasma. The system is evacuated to the desired vacuum, then the foil assembly is rotated by rotation of driveshaft 66 which rotates the drive gear 37 and cylindrical gear 25 upon which the separate foil assemblies are secured such that the four identical foils are in optical alignment with the scintillator mirror system. The detectors are calibrated with the four identical foils in place. Subsequent thereto, the foil assembly is rotated as described above to position four different foils of desired thickness and material in optical alignment with the scintillator-window mirror system.

Assuming the device is in a system for determining plasma electron temperatures, soft X-rays in the source will be transmitted through the metallic foils. Those X-rays transmitted through each separate metallic foil are incident on the respective optically aligned scintillator thereby causing a fluorescent light which passes through the optically aligned window onto the mirrored surface. Each of the mirrors reflect the incident light onto the photo cathode of one of the photomultipler tubes whereby electrons emitted due to the incident light are amplified by the photo tube. The output current from the photomultipler tube is amplified and directed to a recorder.

Such an analyzation of X-rays is carried out by each of the four detectors and the determination of the plasma electron temperatures will depend upon the ratio of intensities of the X-rays transmitted through the various foils. It is well known in the prior art that foils of different thickness and of different materials absorb different intensity X-rays and have been used for determining X-ray intensity and thereby electron temperature of a plasma. Therefore, it is not seen to be necessary to elaborate on the absorption method of determining the plasma electron temperatures through use of the above described system.

As can be seen by the structure of the present invention the foils and the scintillators are within the vacuum system, thereby there is no atmospheric pressure on one side of either the scintillator or foil which would possibly affect the evacuation of the system, if one or the other were to break. Also, the disclosed device enables one to make use of two different sets of foils for separate observations without any disturbance to the vacuum system. Additionally, the structure is such that through the use of the split-rings the foils can be completely changed to present different sets of foils in the system without removing the detector device from the system and without disturbing the optical alignment of this system or attached detectors used in conjunction therewith. Thus the only effect on the system would be that the vacuum would be broken with subsequent evacuation required before use of the device for additional temperature determinations.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In an X-ray detector system for determining plasma electron temperatures which includes:
   a vacuum housing,
   a non-evacuated section about one end of said vacuum housing,
   a foil assembly rotatable within said vacuum housing about the axis thereof within a vacuum surrounding,
   a window-scintillator means positioned relative to said foil assembly in optical alignment therewith,
   said window sealing said vacuum housing against vacuum leakage while exposing said scintillator to a vacuum surounding,
   light reflecting means in optical alignment with said window scintillator assembly means for reflecting light from said scintillator into a detector, and
   an axial passage through said vacuum housing for permitting additional detection means to be connected with said vacuum housing.

2. In an X-ray detector system as claimed in claim 1, in which:
   said foil assembly comprises a plurality of separate foil elements with their centers on a circle with the axis of said assembly as its center.

3. In an X-ray detector system as claimed in claim 2, wherein:
   said plurality of foils within said foil assembly include some foils of the same thickness and material with each of the remainder of said plurality of foils being of different thickness and possibly of different material.

4. In an X-ray detector system as claimed in claim 2, wherein:
   said plurality of foils within said foil assembly include four equally spaced foils of the same characteristics with each of the remainder of said foils having different characteristics.

5. In an X-ray detector system as claimed in claim 4, in which:
said windor-scintillator assembly means comprises four equiangularly spaced window-scintillator elements in optical alignment with four equally spaced foils on said foil assembly whereby on step rotation of said foil assembly one foil of said foil assembly will be in optical alignment with each of said window-scintillator elements.

6. In an X-ray detector system as claimed in claim 5, in which:
   said light reflecting means includes four equiangularly spaced mirror surfaces with one of each of said mirror surfaces on the optical axis of one of each of said window-scintillator elements.

7. In an X-ray detector system as claimed in claim 6, wherein:
   each of said mirror surfaces are concave.

8. In an X-ray detector system as claimed in claim 6, in which:
   a separate detector is positioned on the optical axis of each of said mirror surfaces.

9. In an X-ray detector system as claimed in claim 8, wherein:
   said detectors are mounted onto a second housing which is movable relative to said vacuum housing to permit removal of said foil elements from said device without removing said detector vacuum housing from the vacuum system in which the detector has been assembled for use.

10. In an X-ray detector system as claimed in claim 9, in which:
    means is provided on the outside of said second housing and rotatable with said foil assembly to indicate the position of the various foils relative to the window-scintillator elements.

11. In an X-ray detector system for determining plasma electron temperatures which includes:
    a housing suitable for evacuation,
    a foil assembly rotatable within said housing about the axis of said housing and within a vacuum surrounding,
    said foil assembly including a plurality of foils through which X-rays to be detected may pass,
    a window-scintillator assembly means positioned relative to said foil assembly,
    said window scintillator assembly means including a plurality of window-scintillators in optical alignment with a predetermined number of said plurality of said foils,
    said window-scintillator means sealing said housing against vacuum leakage while exposing said scintillators to a vacuum surrounding,
    whereby X-rays passing through said foils are incident on said scintillators thereby producing a light source in accordance with the intensity of said X-rays.

References Cited

UNITED STATES PATENTS

| | | | |
|---|---|---|---|
| 2,094,103 | 9/1937 | Horsley et al. | 250—86 |
| 2,901,631 | 8/1959 | Hansen et al. | 250—86 |
| 3,156,824 | 11/1964 | Peyser | 250—86 X |
| 3,211,910 | 10/1965 | Anderson | 250—86 |

OTHER REFERENCES

Glasstone and Lovberg: Controlled Thermonuclear Reactions, 1960, pp. 190, 191, and 219.

RALPH G. NILSON, *Primary Examiner.*

A. B. CROFT, *Assistant Examiner.*

U.S. Cl. X.R.

250—49.5, 86